Aug. 28, 1951 T. H. THOMAS 2,566,001
CLUTCH CONTROL MECHANISM
Filed Aug. 3, 1945 3 Sheets-Sheet 1

INVENTOR.
THOMAS H. THOMAS
BY H. O. Clayton
ATTORNEY

Aug. 28, 1951

T. H. THOMAS 2,566,001

CLUTCH CONTROL MECHANISM

Filed Aug. 3, 1945

INVENTOR.
THOMAS H. THOMAS
BY
H. O. Clayton
ATTORNEY

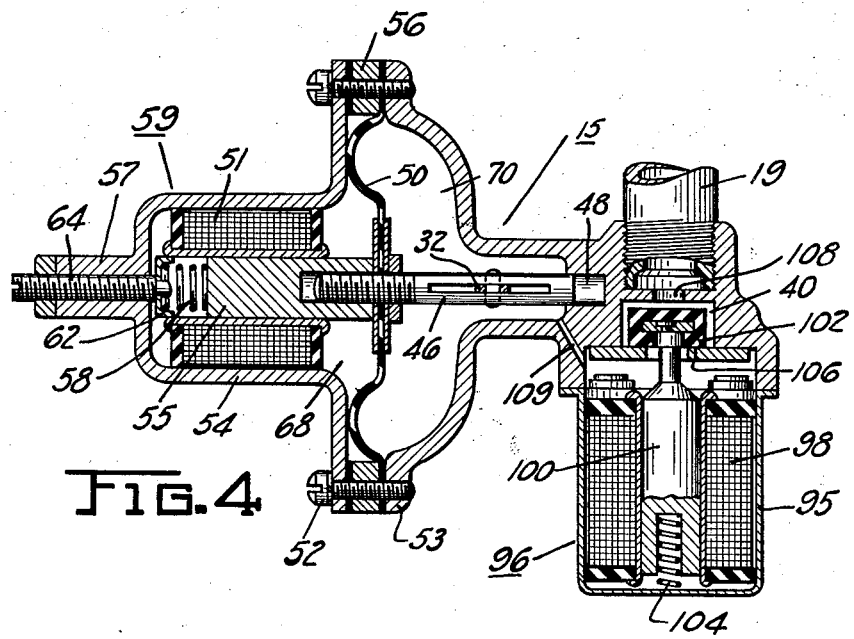
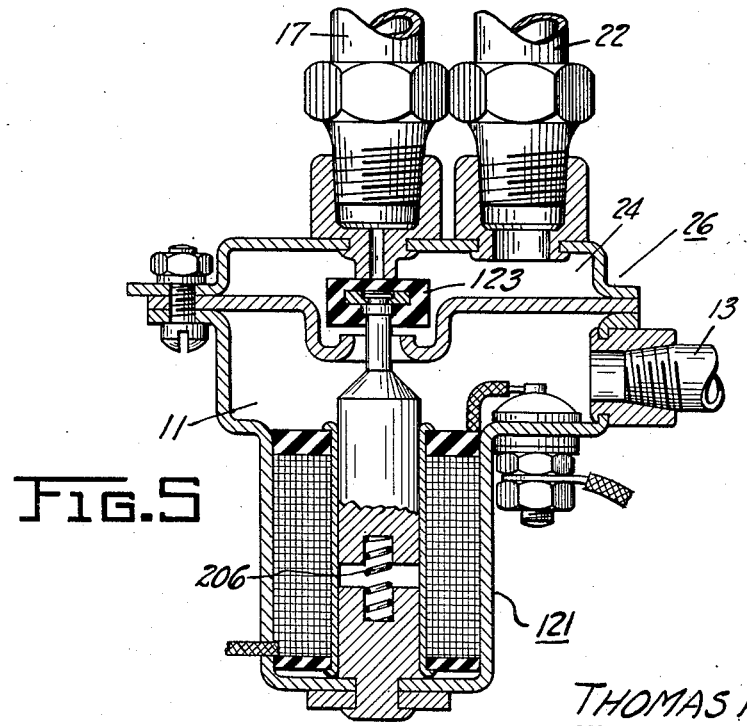

Patented Aug. 28, 1951

2,566,001

UNITED STATES PATENT OFFICE 2,566,001

CLUTCH CONTROL MECHANISM

Thomas H. Thomas, South Bend, Ind., assignor to Bendix Aviation Corporation, South Bend, Ind., a corporation of Delaware Application August 3, 1945, Serial No. 608,725

12 Claims. (Cl. 192—.052)

1

This invention relates in general to clutch control mechanism and in particular to a pressure differential operated clutch control mechanism for operating the friction clutch of an automotive vehicle.

It is an object of my invention to provide power means for operating the friction clutch of an automotive vehicle said power means including a pressure differential operated motor controlled by an operation of the accelerator of the vehicle, the operation of a mechanism, for example the electrical generator of the vehicle, operated by the internal combustion engine of the vehicle in accordance with the speed of said engine and by an operation of a vehicle speed responsive governor and the gear shift lever of the vehicle.

When the friction clutch of an automotive vehicle is operated by a power means it is of course desirable that said power means simulate as closely as possible a skillful manual operation of the clutch. It is therefore the most important object of my invention to provide a clutch operating pressure differential operated motor, the power element of which is so controlled that in effecting the clutch engaging operation of said motor the load of the clutch plates is directly proportional to the R. P. M. of the internal combustion engine of the vehicle; for by this operation there is, under all conditions of clutch operation, sufficient force developed by the engine to drive the driving plate of the clutch.

Yet another object of my invention is to provide a two-stage pressure differential operated motor for operating the friction clutch of an automotive vehicle, the clutch disengaging operation of said motor being in large measure controlled by an operation of a three-way valve controlled by an operation of the accelerator, a vehicle speed responsive governor and the transmission controlling shift lever of the vehicle; and the clutch engaging operation of said motor being in large measure controlled by a balanced type of operation of an air bleed valve mechanism controlled by means comprising the generator of the vehicle or other engine speed responsive mechanism, a differential operated diaphragm and a governor controlled so-called vacuum cut in valve.

A further object of my invention is to provide power means for operating the friction clutch of an automotive vehicle said power means including a single-acting pressure differential operated motor controlled by an accelerator and a gear shift lever and governor controlled three-way valve operable to effect a clutch disengaging

2 operation of said motor and to initiate the first stage of a two-stage clutch engaging operation of said motor the clutch plate contacting operation, that is the second stage of operation of said motor being controlled by a bleed valve operable to control the flow of air into said motor said bleed valve being controlled by an engine speed responsive means and by a pressure differential operated motor operable in accordance with the degree of gaseous pressure within the clutch operating motor.

A further object of my invention is to provide a single-acting pressure differential operated motor for moving the driving plate of a friction clutch to its clutch disengaged position and for controlling the operation of the clutch springs in their operation of moving said driving clutch plate into engagement with the driven clutch plate, the clutch engaging operation of said motor being controlled in part by a so-called pressure balanced type of follow-up valve said valve being controlled in part by the generator of the vehicle or other mechanism the operation of which is directly proportional to the speed of the engine.

Yet another object of my invention is to provide a two-stage pressure differential operated motor for operating the friction clutch of an automotive vehicle the first stage of clutch engaging operation of said motor being effected by an operation of the accelerator of the vehicle and the second stage of clutch engaging operation of said motor being effected by an operation of a valve controlled by the generator of the vehicle or any other part of the power plant of the vehicle capable of controlling a flow of electrical current in accordance with, that is in direct proportion to, the speed of the engine of the vehicle.

Yet another object of my invention is to provide power means for operating the friction clutch of an automotive vehicle said power means including a single acting pressure differential operated motor controlled by a power operated three-way valve having fluid transmitting connections with the atmosphere, a source of vacuum, and the motor, the connection with the atmosphere being controlled by a power operated three-way valve operable to control the gaseous pressure within the motor in its operation of controlling the engagement of the clutch.

Other objects of the invention will appear more fully hereinafter from the following detailed description when taken in connection with the accompanying drawing wherein a single embodiment of the invention is illustrated.

Figure 4 is a sectional view, taken on the line 4—4 of Figure 3 disclosing the details of the valve operating motor and details of the solenoid operated vacuum cut-in valve built into the so-called air bleed valve mechanism; and Figure 5 is a sectional view disclosing details of the so-called three-way transfer valve of the clutch control mechanism constituting my invention.

Figure 1:
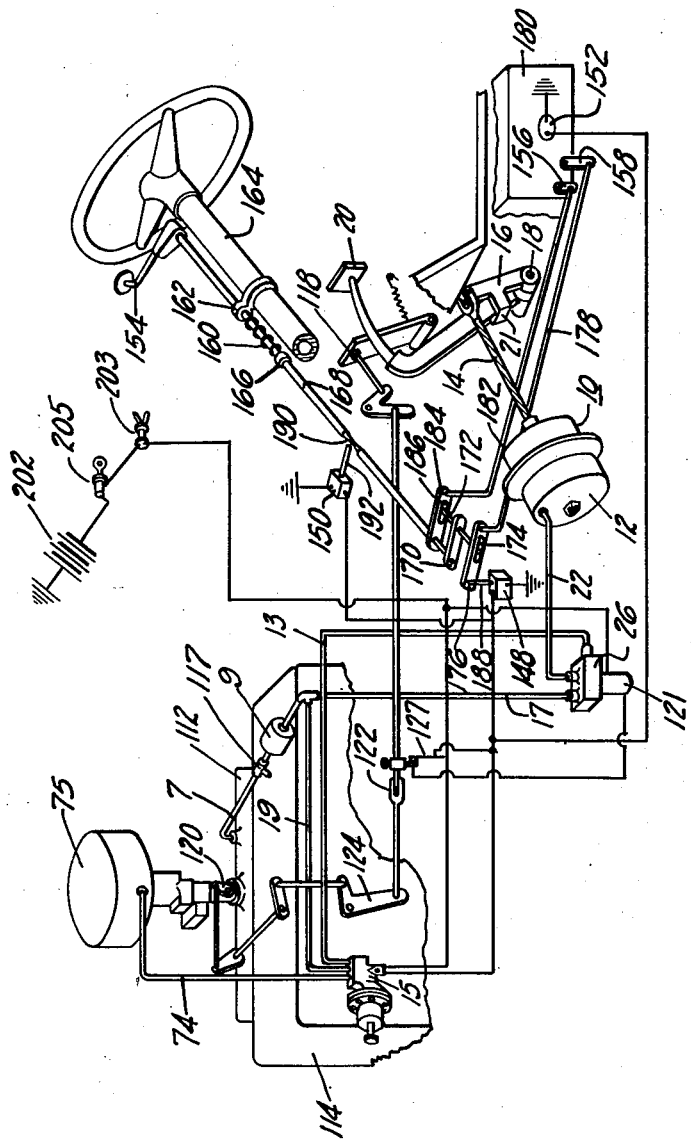
Figure 1 is a diagrammatic view disclosing the principal features of my invention.

Describing now that embodiment of my invention disclosed in the several figures of the drawings the principal elements thereof consist of a single acting vacuum motor 10 comprising a casing 12 and a power element such as a piston, not shown, which is connected to a friction clutch, not shown, of a conventional design, that is, one including driving and driven elements. One end of the casing of the motor, a portion of the body thereof and the power element together outline a control chamber, the gaseous pressure within said chamber being controlled to control the operation of the motor. The force transmitting means interconnecting the power element of the motor with the clutch preferably includes a flexible cable 14 connected to a crank 16 and said crank is fixedly connected to a shaft 18 which is connected to the clutch. A foot operated pedal 20, contactable with a flange 21 extending from the crank 16, is also preferably included in the clutch operating mechanism.

One end of the motor 10, that is, the end of the same constituting a part of the aforementioned power compartment of the motor, is connected by a conduit 22 to a compartment 24 of a power operated three-way valve unit indicated as a whole by the reference numeral 26 and disclosed in detail in Figure 5. A compartment 11 of said three-way valve unit 26 is connected, by a conduit 13, with a compartment 25 of a power operated air bleed control valve 15; and the aforementioned compartment 24 is connected, by a conduit 17, with a conduit 19 which conduit interconnects the air bleed valves 15 with a vacuum tank 9 said tank being connected, by a conduit 7, with the intake manifold of the internal combustion engine. The intake manifold is indicated by the reference numeral 112 and the engine by the reference numeral 114.

Figure 3:
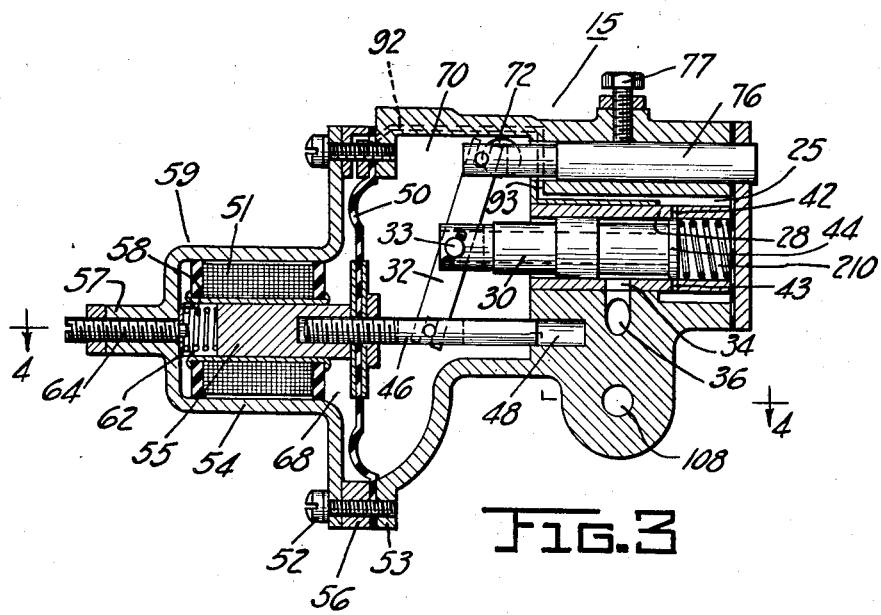
Figure 3 is a longitudinal sectional view of the air bleed valve taken on the line 3—3 of Figure 2.

Describing now the details of the power operated air bleed valve 15 the casing of said valve is provided with a cylindrically shaped bore to receive a cylindrical sleeve valve member 28 constituting one of the two parts of a three-way valve; and said casing is counterbored to provide the aforementioned compartment 25, Figure 3. A spool shaped valve member 30, provided with a cylindrically shaped bore to permit the passage of air therethrough, constitutes the other part of the three-way valve. One end of the latter valve member is provided with opposed slots to receive therebetween a floating lever member 32 which lever member is pivotally connected to the valve member 30 by a pin 33 extending through said lever and mounted in openings in the end of said valve member. The small diametered portion of a spool shaped end portion of the valve member 30 registers at all times with a vacuum port 34 in the sleeve 28 said port registering with a diagonally extending duct 36 within the valve casing said duct leading to a valve compartment 40, Figure 4. The sleeve 28 is, as disclosed in Figure 3, provided with transversely extending ports 42 and 43 which are at times, that is when the three-way valve is lapped, covered by a land 44 constituting the peripheral portion of the end flange of the spool shaped valve member 30. The valve 30 is shown in its lapped position in Figure 3.

A pin 46 is reciprocably mounted at one of its ends within a recess 48 in the valve casing and is detachably connected at its other end to a spring, pressure differential and electromagnetically operated diaphragm 50 which is detachably secured at its periphery, by bolts 52, to a flange portion 53 of the valve casing and to a cup shaped casing member 54. The latter member houses one of the most important elements of my invention, that is, an electromagnet comprising a winding 51 and an armature 55; and said armature is secured to the central portion of the diaphragm 50.

The winding 51 is preferably wired to a source of electrical current, for example, the generator of the vehicle, whereby the degree of energization of the electromagnet, that is the degree of current flowing through the winding 51, is directly proportional to the R. P. M. of the internal combustion engine of the vehicle. It is to be particularly noted that the current flow through the electromagnet 51, 55 need not necessarily be controlled by the generator; for it is within the purview of my invention to employ any engine driven mechanism as a means for controlling the current to the electromagnet it being necessary however that the degree of said current be directly proportional to the speed of the engine.

The casing member 54, the flange portion 53, a spacer ring 56, the end portion of the valve casing, the electromagnet and the diaphragm 50 together constitute a motor 59 constitute a part of the means for actuating the reciprocable three-way valve member 30. A spring 58, the friction of which is described hereinafter, is interposed between one end face of the armature 55 and a spring retainer cup member 62 the central portion of which is contacted by the end portion of a pin 64 adjustably mounted in a boss 57 projecting from the end of the casing member 54. The spring 58 is housed within what is termed the control compartment 68 of the motor 59 and the remaining compartment 70 of said motor is at all times vented to the atmosphere via a port 72. To this port there is connected a conduit 74, Figures 1 and 2, preferably leading to an air cleaner 75. The degree of compression of the spring 58 may be varied by varying the position of the pin 64 within the boss 57.

To the upper end of the lever 32 there is pivotally connected the inner end of a pin 76 adjustably mounted, by means of a set screw 77, within a portion of the valve casing bored to receive said pin.

Completing the description of the bleed valve unit 15 the casing is provided with ducts 92 and 93, Figure 3, permanently interconnecting the control compartment 68 of the motor 59 with the aforementioned valve compartment 25. There is thus provided fluid transmitting means for at all times interconnecting the compartment 68, the valve compartment 25 and the control compartment of the clutch operating motor 10. It is to be noted at this juncture that the clutch control mechanism constituting my invention is in large measure controlled by controlling the gaseous pressure within the valve compartment 25.

Referring now to Figure 4 there is here disclosed the details of a solenoid and spring operated vacuum cut-in three-way valve unit said unit cooperating with the three-way bleed valve 30 to effect the desired two stage clutch engaging operation of the motor 10. To a portion of the valve casing there is secured, by set screws 94, Figure 2, a cap member 95 constituting a part of a solenoid indicated as a whole by the reference numeral 96. This solenoid comprises a winding 98 and an armature 100 the latter having secured to its reduced inner end a vacuum cut-in valve member 102 housed within the aforementioned compartment 40. When the solenoid 96 is energized the armature 100 is drawn downwardly, Figure 4, against the resistance of a compression spring 104. With this operation the valve member 102 is seated at 106 thereby interconnecting the chamber 40 with a port 108 which port, by virtue of the conduit 19, is connected with a vacuum tank 9 which is in turn connected with the intake manifold 112 of the internal combustion engine 114 of the vehicle. As is well known in this art the intake manifold of the engine becomes a source of vacuum when the throttle of the engine is closed. A check valve 117 is preferably interposed in the connection between the intake manifold and the tank 9. A duct 109 in one of the parts of the casing of the valve operating motor 59 provides a means for venting the compartment 40 to the atmosphere when the valve member 102 is moved off of its seat by the spring 104; for it will be remembered that the compartment 70, to which the duct 109 is connected, is vented to the atmosphere by the port 72, Figure 3. There is thus provided a compact bleed valve control unit for controlling the engagement of the clutch said unit comprising a multi-sectioned casing housing two three-way control valves and also housing means for operating said valves.

Figure 2:
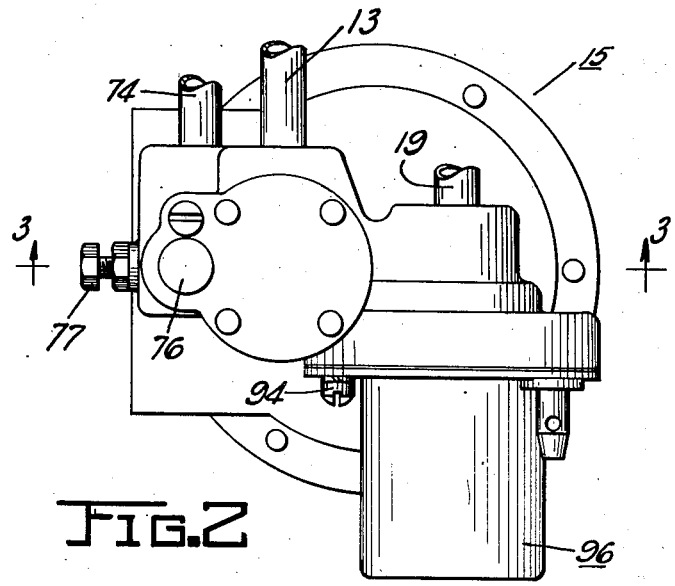
Figure 2 is a plan view looking down upon the top of the air bleed valve mechanism of my invention.

Completing the description of the clutch control mechanism constituting my invention the accelerator 118 of the vehicle is connected to a throttle operating crank 120 by the several links and bell crank levers disclosed in Figure 1; and as will appear from the description to follow one feature of my invention lies in a lost motion connection 122 in the connection between a bell crank lever 124 and the accelerator.

Describing now the electrical control means of my invention, as is disclosed in Figure 1 the valve operating solenoid 96 is controlled by grounded selector lever operated breaker switches 148 and 150 electrically connected in parallel with each other, and by a grounded vehicle speed responsive governor operated breaker switch 152 which is electrically connected in parallel with the aforementioned switches 148 and 150; and the armature of a solenoid 121, operative to actuate a valve member 123 of the three-way valve 26, is controlled by the aforementioned switches 148, 150 and 152 and by an accelerator operated breaker switch 127. As is disclosed in Figure 1 the latter switch is electrically connected in series with the solenoid 121 and the aforementioned grounded switches 148, 150, and 152 the latter three switches being connected in parallel with each other. The construction of the breaker switch 127 and its connection with the accelerator is such that the same is closed when the accelerator is completely released and is opened prior to taking up the lost motion of the lost motion connection 122. A transmission and clutch operating selector lever 154 is preferably connected with the switches 148, 150 and transmission operating cranks 156 and 158, by the force transmitting links and levers disclosed in Figure 1.

Describing the operation of this force transmitting means and the construction thereof, a spring 160, interposed between a stop 162 fixedly secured to the steering post 164 of the vehicle and a stop 166 fixedly secured to a shaft 168, serves to bias said shaft downwardly to the position disclosed in Figure 1. To the lower end of the shaft 168 there is fixedly secured a crank 170 through which extends a pin 172; and when said shaft is moved downwardly by the spring 160 one end of said pin moves into a slot 174 in a floating crank 176. To one end of the crank 176 there is pivotally connected a rod 178 said rod being pivotally connected at its other end to the end of the crank 158. This crank when rotated clockwise serves to actuate other force transmitting means within the casing of a three speeds forward and reverse transmission 180 to establish the transmission in its high gear setting; when the crank 176 is rotated counterclockwise said transmission is established in its second gear setting.

The crank 156 when rotated clockwise serves to establish the transmission in its low gear setting and when rotated counterclockwise serves to establish the transmission in reverse gear. The connection between the crank 156 and the shift lever 154 includes a link 182 pivotally connected to a floating lever 184 said lever being slidably and rotatably mounted on the shaft 168. This lever 184 is provided with a slot 186 to receive one end of the pin 172.

When the driver wishes to establish the transmission in its second gear setting he rotates the shift lever 154 counterclockwise and this operation serves to rotate the floating lever 176. Now the switch 148 is preferably so constructed that the force necessary to close the same, that is the force necessary to compress a spring within the switch connected to its movable contact, is less than the force necessary to effect the initial movement of the high, second shift rail of the transmission 180. It follows therefore that the initial movement of the shift lever results in a pivoting of the lever 176 about its connection with the link 178; and this operation results in a closing of the clutch controlling switch 148. Continued movement of the shift lever, that is the movement after the switch 148 is closed and there is no possible further movement of a link 188 interconnecting the lever 176 with said switch, results in a clockwise rotation of said lever about its pivotal connection with the link 188; and this operation results in a counterclockwise rotation of the crank 158 to establish the transmission in its second gear setting. After this setting is established the driver removes his hand from the shift lever whereupon the aforementioned spring within the switch 148 operates to rotate the lever 176 clockwise about its pivoted connection with the link 178 to thereby open said switch. This switch is so constructed that the same is also closed when the driver moves the shift lever to establish the transmission in its high gear setting; and the spring means within said switch also functions to open the same when the high gear setting of the transmission has been established and the driver removes his hand from the shift lever. In this high gear operation of the mechanism the operation of the lever 176 is in part the reverse of its operation in effecting a second gear setting of the transmission; for when the shift lever 154 is rotated in a clockwise direction to establish the transmission in high gear the lever 176 is first rotated counterclockwise about the pivotal connection between the rod 178 and the lever 176 to close the switch 148; and the lever 176 is then rotated in a counterclockwise direction about its pivotal connection with the link 188 to effect the aforementioned high gear setting of the transmission.

Describing the operation of the switch mechanism to establish the transmission in either reverse gear or low gear the driver first rotates the shift lever upwardly in a plane perpendicular to the plane of the steering wheel; and this operation serves to bodily move the shaft 168 upwardly against the tension of the spring 160. The upper end of the pin 172 is by this operation moved into the slot 186; and a subsequent rotation of the shift lever, either to establish the transmission in reverse or low gear, results in a rotation of the cranks 170 and 156 and the lever 184 to effect one or the other of these settings of the transmission. The shaft 168 is provided with an hour-glass shaped recess portion 190 which receives a pin 192 operably connected to the grounded breaker switch 150; and as will be obvious from an inspection of Figure 1 when said shaft is moved upwardly, in the operation of establishing the transmission in either reverse or low gear, the switch 150 is closed by virtue of the forcing of the pin 192 to the left, Figure 1, when the end of said pin is forced onto a cone shaped portion of the recess 190; then after the low gear or reverse gear operation of the transmission is completed the driver will release the shift lever whereupon the spring within the switch 150 will open said switch the shaft 168 being bodily moved as the pin 192 returns to the center of the recess 190. In the latter operation the pin 172 moves out of the slot 186. When the gear shift lever is operated to shift the transmission from either its reverse gear setting or its low gear setting to either its second gear setting or high gear setting, the first increment of movement thereof results in a closing of the switch 150 as the pin 172 is moved back into the slot 186. The power means is then again rendered operative to disengage the clutch to facilitate a neutralization of the transmission. The shift lever is then moved to its transmission neutral position preparatory to a movement thereof to establish the transmission in either its high or second gear setting; and this transmission neutralizing movement of the shift lever effected by the expansion of the spring 160, serves to open the switch 150. Thereafter the shift lever is moved to establish the transmission in either high or second gear the switch 148 being operated to effect an operation of the clutch, all as is described above.

There is thus provided, by the above described shift lever operated switch operating mechanism, means for effecting a clutch disengaging operation of the motor 10 during the first increment of movement of the shift lever as it is moved to establish the transmission in any one of its four gear settings. To effect this operation however it is of course necessary to first release the accelerator to close the switch 127. The parts of the mechanism are preferably so constructed and arranged and so operative that the clutch is disengaged before the transmission is operated. It is also to be noted that the switch operating force transmitting means of my invention is such as to effect a closing of the clutch control switch mechanism when the shift lever is moved in either one of two different planes said switch mechanism being automatically opened by a release of the shift lever said operation serving to effect a re-engagement of the clutch. Briefly describing the clutch disengaging operation when the switch 127 and any one of the switches 148, 150 and 152 is closed then the ground connection to the solenoid 121 is completed and the so-called hot wire connection from said solenoid couples the latter with a grounded battery 202; accordingly the solenoid 121 is energized and with this operation the valve 123 is operated to connect the control compartment of the motor 10 with the intake manifold thereby energizing said motor to effect a disengagement of the clutch. Referring to the aforementioned hot wire connection there is included therein a cut out switch 203 and the ignition switch 205 of the vehicle.

The above described clutch control mechanism of my invention may be incorporated in the power plant of a vehicle which includes a so-called kickdown type of selective gear transmission that is a transmission which may, by a manual operation of a shift lever, be established in one or the other of two forward gear settings and a reverse gear setting; and after one of said forward gear settings is established then a vacuum and spring operated kickdown motor unit, controlled by a vehicle speed responsive governor and the accelerator of the vehicle, takes over the operation of said transmission. In this type of well known transmission mechanism the kickdown or downshift operation of the motor unit is facilitated by a momentary disabling of the ignition system of the engine; and the power plant including such a mechanism may also include a fluid coupling.

Describing now the complete operation of the mechanism constituting my invention and incidentally completing the description of the parts thereof not heretofore described, when the accelerator 118 is released to close the throttle and idle the internal combustion engine 114, the intake manifold 112 of said engine is partially evacuated to in turn evacuate the tank 9. There is thus provided a source of vacuum for energizing the motor 10 to disengage the friction clutch of the motor vehicle; and as described above this operation is effected with the release of the accelerator and either an operation of the shift lever 154 or a slowing down of the vehicle below governor speed either of said operations effecting an energization of the solenoid 121 to open the valve 123. Incidentally the parts of the mechanism are so constructed and arranged that the valve member 30 and the means for operating the same assume, at this time, the relative positions disclosed in Figure 3. Explaining the latter operations when the valve 123 is opened as a result of the energization of the solenoid 121 the motor 10 is energized to disengage the clutch; and at the same time the solenoid 96 is energized to open the valve 102 thereby connecting the port 34 of the valve 15 with the source of vacuum. The latter operation results in an energization of the motor 59 to move the valve member 30 to its lapped position, that is, the position disclosed in Figure 3. The several forces acting upon the valve member 30 to effect this lapping operation are described in detail hereinafter.

To initiate the clutch engaging operation of the power means of my invention, that is, effect the so-called first stage of clutch-engaging operation of the motor 10, the driver, if the clutch has been disengaged incident to an operation of the transmission to establish the same either in its second gear setting or its high gear setting, releases his grip upon the shift lever 154 to permit the spring within the switch 148 to open said switch; or he may initiate the clutch engaging operation by depressing the accelerator to open the switch 127; and either one of these operations effects a deenergization of the solenoid 121 thereby permitting a spring 206 to close the valve member 123, that is connect the control compartment of the motor 10 with the compartment 25 of the bleed valve 15 via the conduits 22 and 13. Air is then drawn out of the compartment 68 of the valve operating motor 59 into the control compartment of the motor 10 by the clutch engaging, that is expanding operation, of the clutch springs; and this operation, resulting in the creation of a partial vacuum in the compartment 68, serves to draw the valve member 30 to the left, Figure 3, to vent the ports 42 and 43 to the atmosphere via a valve compartment 210, the interior of the valve member 30 and the atmospheric vent port 72. Explaining in greater detail this operation of moving the valve member 30 to the left it will be apparent, from an inspection of Figure 3, that when the compartment 68 is partially evacuated the diaphragm 50 is subjected to a differential of pressures; for the motor compartment 70 is at the time vented to the atmosphere via the port 72. Air then rushes into the compartment 68 and the control compartment of the motor 10; and when the gaseous pressure within said compartments reaches a certain factor, that is the factor to effect a lapping of the valve member 30, then said valve member 30 is again lapped.

Now as to this valve lapping operation a very important feature of my invention lies in the construction, arrangement and adjustment of the parts of the valve 15, including a setting of the pin 76, the strength of the spring 58, and the motor idling pull of the electromagnet 51, 55, to automatically effect a lapping of the valve 30 when the gaseous pressure within the motor 10 reaches a certain factor; and it is to be remembered that the gaseous pressure within the compartment 68 and the control compartment of the motor 10 is the same at all times. The parts of the mechanism are preferably so constructed and arranged and so operative that the first stage of the clutch engaging operation, that is movement of the driving clutch plate, is terminated just prior to the contacting of the clutch plates; and the valve 30 is automatically lapped when this occurs.

Now to effect the all important controlled engagement of the clutch plates, that is, to effect the second stage operation of the power means of my invention, the driver continues the depression of the accelerator thereby effecting an opening of the throttle to speed up the engine; and this operation results in an increase in the pull of the electromagnet 51, 55 with a resultant leftward movement of the valve member 30 to again vent the motor 10 and the valve compartment 68 to the atmosphere. This results in a reduction of the differential of pressures acting upon the power element of the motor 10 with a resultant certain loading of the clutch plates. Then when the gaseous pressure within the compartment 68 is increased sufficiently to make the leftward pull of the diaphragm 50 plus the leftward pull of the electromagnet equal to the rightward push of the spring 58 then the valve 30 is again lapped. The motor 59 including the diaphragm 50, the spring 58 and the electromagnet 51, 55 constitutes actuators serving to operate the valve member 30.

It is apparent therefore that there is provided, by the bleed control valve 15 of my invention, means for effecting a clutch plate loading which is directly proportional to the speed of the engine; and this is exactly the result desired for the engine torque necessary to drive the driving clutch plate should increase proportionately with the increase in clutch plate loading. It is to be noted that with the mechanism of my invention the summation of the loads of the diaphragm 50 and the electromagnet 51, 55 always equals the constant force exerted by the spring 58 to effect a lapping of the valve 30. As the load of the electromagnet increases the load of the diaphragm 50 decreases; for with an increase in the former load the valve 30 is pulled to the left, Figure 3, to vent the compartment 68 to the atmosphere; and when this occurs the differential of pressures acting on the diaphragm 50 is lowered. It follows therefore that when the driver wishes to increase the clutch plate loading said operation may be effected merely by depressing the accelerator to increase the speed of the engine; for this operation results in the proportionately greater energization of the electromagnet and this results in a reduced energization of the motor 10.

An important feature of my invention lies in the operation of the governor controlled vacuum cut-in valve 102; for it is to be noted that after the valve 30 is lapped should the speed of the engine then be reduced i. e. if the engine labors, then the three forces maintaining said valve lapped will be unbalanced thereby resulting in a movement of the same to the right, Figure 3, to uncover the ports 42 and 43 and reconnect the motor 10 with the source of vacuum, that is the tank 9. The presence of said tank insures a source of vacuum at all times during the operation of the clutch control mechanism of my invention. This operation will, of course, through the increase in energization of the motor 10, result in a lessening of the then existing clutch plate load, that is, the load causing the engine to labor.

Now the vacuum connection to the valve port 34, Figure 3, is controlled by the vacuum cut-in valve 102 the operation of which, by virtue of the electrical control means disclosed in Figure 1, is controlled in part by the vehicle speed responsive governor, not shown. Below governor speed the governor operated switch 152 is closed to energize the solenoid 96 to open the valve 102 accordingly it follows that the above described what may be termed recovery operation of the clutch control mechanism is only possible when the vehicle is travelling below the so-called governor speed; but with normal driving the engine torque is relatively high when the vehicle is travelling at a fairly high speed that is above the so-called governor speed accordingly the above described recovery of the mechanism is not needed at this time.

There is thus provided a simple, compact and automatic clutch control mechanism the clutch being automatically disengaged when the accelerator is released and either the speed of the car is reduced below a certain factor to operate the governor operated switch 152 or the driver actuates the selector lever 154 to operate the transmission thereby operating one or the other of the switch 148 and 150. The clutch is subsequently reengaged in two stages when the car is traveling at or below a certain speed, the first of the two stages of operation being initiated by a depression of the accelerator to open the switch 127 to thereby effect a closing of the valve 123, and the second of the two stages of operation being effected by depressing the accelerator to open the throttle, the clutch plate loading during said engagement being directly proportional to the engine speed; and the clutch is engaged in two stages when the car is traveling above the aforementioned certain speed, that is, governor speed, the first stage being initiated by an opening of either of the switches 148 or 150 and the second stage being effected by an opening of the accelerator as discussed above.

I claim:

1. In an automotive vehicle provided with a friction clutch, an internal combustion engine, a gear shift lever, a vehicle speed responsive governor, an accelerator, an engine throttle, and means, including a lost motion connection, interconnecting the accelerator and throttle; power means for operating said clutch to effect a disengagement of the clutch and a two-stage engagement thereof, said power means comprising a pressure differential operated motor the power element of which is operably connected to the clutch, and valve means for controlling the operation of said motor including a three-way valve operable to effect a clutch disengaging operation of said motor and to initiate the clutch engaging operation thereof, a solenoid and a spring for controlling the operation of said three-way valve, electrical means, including an accelerator operated switch operable during the lost motion operation of the aforementioned accelerator to throttle connection, for controlling the operation of said solenoid, said motor controlling valve means further including a bleed valve operable to control the flow of air into the motor and thereby control the clutch engaging operation of said motor, and means for controlling the operation of said bleed valve comprising a pressure differential operated motor and an electromagnet operable in accordance with the speed of the engine.

2. In an automobile vehicle provided with a change speed transmission, an internal combustion engine having a throttle valve and a friction clutch; power means for operating the clutch comprising a pressure differential operated motor operably connected with the clutch, valve means for controlling the operation of the motor including a three-way valve operable to effect a clutch disengaging operation of the motor and to initiate a clutch engaging operation thereof, means for controlling the operation of said three-way valve including a switch operable incident to the operation of the throttle and a switch operable incident to the operation of the transmission, said three-way valve controlling means serving to open said valve to effect a clutch disengaging operation of the motor when the throttle is closed and when the transmission is being operated, said motor controlling valve means further including a three-way bleed valve mechanism for controlling the decrease in differential of pressures acting on the power element of the motor to thereby control the clutch engaging operation of the motor, said bleed valve mechanism including a follow-up valve, the operation of which is controlled in accordance with the speed of the engine and the degree of gaseous pressure within the control compartment of the pressure differential operated motor.

3. In an automotive vehicle provided with an internal combustion engine including an intake manifold, a throttle, an accelerator, force transmitting means, including a lost motion connection, interconnecting the throttle and accelerator, a vehicle speed responsive governor and a friction clutch; two-stage power means for operating said clutch comprising a pressure differential operated motor operably connected to the clutch, valve means for controlling the operation of said motor including a three-way valve operative to effect a clutch disengaging operation of the motor and to initiate a clutch engaging operation thereof, a bleed valve mechanism for bleeding air into the motor to control the clutch engaging operation thereof, air transmitting means interconnecting the intake manifold with the latter valve mechanism and with the three-way valve, air transmitting means interconnecting the bleed valve mechanism with the three-way valve, air transmitting means interconnecting the three-way valve with the motor, means for controlling the operation of the three-way valve comprising a switch operated by the governor and a switch closed when the accelerator is fully released and opened during the taking up of the lost motion in the connection between the accelerator and throttle, means for operating the bleed valve mechanism including electromagnetic means operative in accordance with the speed of the engine and further including pressure differential operated means operative in accordance with the gaseous pressure existing within the aforementioned clutch operating motor; the parts of the clutch control mechanism being so constructed and arranged and so operative that the clutch is disengaged when the accelerator is fully released and also so operative that the first stage of engagement of the clutch is completed just prior to an opening of the throttle and the second stage of engagement of the clutch is initiated when the speed of the engine is increased above idling speed.

4. A clutch control mechanism comprising a single-acting pressure differential operated motor adapted to be connected to a clutch and a control mechanism for said motor comprising a power operated three-way valve, a power operated three-way bleed valve operable to control the flow of air into the motor and at times from the motor via the three-way valve, fluid transmitting means adapted to connect the power operated three-way valve with a source of vacuum, fluid transmitting means connecting the power operated three-way valve with the motor and fluid transmitting means interconnecting the power operated three-way valve with the power operated three-way bleed valve.

5. A clutch control mechanism comprising a pressure differential operated motor adapted to be connected to a clutch and a control mechanism for said motor comprising a power operated three-way valve, a three-way bleed valve operable to control the air into the motor and at times from the motor via the three-way valve, fluid transmitting means adapted to connect the power operated three-way valve with a source of vacuum, fluid transmitting means connecting the power operated three-way valve with the motor, fluid transmitting means interconnecting the power operated three-way valve with the three-way bleed valve, and power means for operating the latter valve including a pressure differential operated motor.

6. A clutch control mechanism comprising a pressure differential operated motor adapted to be connected to a clutch, and a control mechanism for said motor comprising a power operated three-way valve, a three-way pressure balanced bleed valve operable to control the flow of air into the motor and at times from the motor via the three-way valve, fluid transmitting means adapted to connect the power operated three-way valve with a source of vacuum, fluid transmitting means connecting the power operated three-way valve with the motor, fluid transmitting means interconnecting the power operated three-way valve with the three-way bleed valve and power means for operating and controlling the operation of the latter valve including a pressure differential operated motor operable, together with other means, to move the valve to any one of plurality of control positions, and a solenoid operated vacuum cut-in valve operable, at times, to connect the bleed valve with a source of vacuum.

7. A clutch control mechanism comprising a pressure differential operated motor adapted to be connected to a clutch, and a control mechanism for said motor comprising a three-way valve operable to effect a clutch disengaging operation of the motor and initiate a clutch engaging operation of said motor, a pressure balanced three-way bleed valve movable to a plurality of control positions including a lapped position said valve being operable to control the power fluid flowing into the motor and at times from the motor to control the clutch engaging operation of said motor, fluid transmitting means adapted to connect the three-way valve with a source of vacuum, fluid transmitting means connecting the three-way valve with the motor fluid transmitting means connecting the three-way valve with the three-way bleed valve, and power means for operating and controlling the operation of the latter valve including a pressure differential operated motor, a spring, and an electromagnet the valve operating load exerted by two of the latter three mechanisms varying the clutch engaging operation of the clutch control mechanism, the summation of said loads being a constant when the valve is lapped.

8. In an automotive vehicle provided with a change speed transmission and a friction clutch, power means for operating the clutch including a pressure differential operated motor operably connected to the clutch, valve means for controlling the operation of the motor including a three-way valve operable to effect an energization of the motor to disengage the clutch and also operable to initiate an engagement of the clutch by effecting a de-energization of the motor, a pressure balanced three-way bleed valve operable to control the flow of power fluid into the motor and, at times, from the motor via the three-way valve to thereby control the clutch engaging operation of the motor, means for controlling the operation of the bleed valve including a vacuum cut-in valve operative to control the connection between the bleed valve and a source of vacuum, means for controlling the operation of the vacuum cut-in valve including electrical means operative to open the valve when the vehicle is traveling below a certain speed, and means, including a pressure differential operated motor, for actuating the bleed valve.

9. A clutch control mechanism comprising a single-acting pressure differential operated motor adapted to be connected to a clutch and a control mechanism for said motor comprising a three-way valve, a three-way bleed valve operable to control the flow of air into the motor and at times from the motor via the three-way valve, fluid transmitting means adapted to connect the three-way valve with a source of vacuum, fluid transmitting means connecting the three-way valve with the motor and fluid transmitting means interconnecting the three-way valve with the three-way bleed valve.

10. A clutch control mechanism comprising a pressure differential operated motor adapted to be connnected to a clutch and a control mechanism for said motor comprising a three-way valve, a three-way bleed valve operable to control the flow of air into the motor and at times from the motor, fluid transmitting means adapted to connect the three-way valve with a source of vacuum, fluid transmitting means connecting the three-way valve with the motor, fluid transmitting means interconnecting the three-way valve with the three-way bleed valve, and power means for operating the latter valve including a plurality of motors comprising a pressre differential operated motor.

11. A clutch control mechanism comprising a pressure differential operated motor adapted to be connected to a clutch, and a control mechanism for said motor comprising a three-way valve, a three-way pressure balanced bleed valve operable to control the flow of air into the motor and at times from the motor, fluid transmitting means adapted to connect the three-way valve with a source of vacuum, fluid transmitting means connecting the three-way valve with the motor, fluid transmitting means interconecting the three-way valve with the three-way bleed valve, and power means for operating and controlling the operation of the latter valve includ--ing a pressure differential operated motor operable, together with other means, to move the valve to any one of plurality of control positions, and further including a solenoid operated vacuum cut-in valve operable, at times, to connect the bleed valve with a source of vacuum.

12. A clutch control mechanism comprising a fluid pressure operated motor adapted to be connected to the friction clutch of an automotive vehicle and a control mechanism for said motor comprising a three-way valve operable to effect a clutch disengaging operation of the motor and to initiate a clutch engaging operation of said motor, a three-way bleed valve operable to control the power fluid flowing to the motor and at times from the motor to control the clutch engaging operation thereof, fluid transmitting means interconnecting the three-way valve with the motor, fluid transmitting means interconnecting the three-way valve with the three-way bleed valve, fluid transmitting means adapted to connect the three-way valve with a source of vacuum, power means for operating the three-way valve and power means for operating the three-way bleed valve said two power means including a manually operable switch mechanism adapted to be actuated by a transmission operating gear shift lever and operable to control the operation of both the three-way valve and the three-way bleed valve, and further including a switch mechanism adapted to be actuated by a vehicle speed responsive governor and operable to control the operation of both the three-way valve and the three-way bleed valve.

THOMAS H. THOMAS.

REFERENCES CITED

The following references are of record in the file of this patent:

UNITED STATES PATENTS

| Number | Name | Date |
|---|---|---|
| 2,348,435 | Hey et al. | May 9, 1944 |
| 2,365,469 | Hey et al. | Dec. 19, 1944 |